United States Patent [19]
Lee et al.

[11] Patent Number: 5,684,357
[45] Date of Patent: Nov. 4, 1997

[54] THERMION EMITTING OXIDE CATHODE AND METHOD FOR MAKING THE SAME

[75] Inventors: Kwang-Min Lee; Kyu-Nam Joo; Jong-Seo Choi; Geun-Bae Kim; Kwi-Seuk Choi; Sang-Won Lee, all of Suwon, Rep. of Korea

[73] Assignee: Samsung Display Devices Co., Ltd., Kyungki-do, Rep. of Korea

[21] Appl. No.: 569,706

[22] Filed: Dec. 8, 1995

[30] Foreign Application Priority Data

Dec. 28, 1994 [KR] Rep. of Korea .................. 94-38125

[51] Int. Cl.⁶ ................................................. H01J 1/14
[52] U.S. Cl. .............. 313/346 R; 313/270; 313/346 DC
[58] Field of Search ............................. 313/270, 310, 313/311, 337, 339, 346 R, 346 DC

[56] References Cited

U.S. PATENT DOCUMENTS 2,866,915   12/1958   Fang .
4,924,137    5/1990   Watanabe et al. ............ 313/346 R
5,118,984    6/1992   Saito et al. ................... 313/346 R

FOREIGN PATENT DOCUMENTS 820187   9/1959   United Kingdom .

OTHER PUBLICATIONS

Kudaka et al., "Some Observation on the Aggregate Particles Produced During Pyrolysis of PTC Barium Titanate Precursor Synthesized by the Oxalate Method", Journal of the Ceramic Society of Japan, vol. 102, No. 5, May 1994 Tokyo.

Primary Examiner—Sandra L. O'Shea
Assistant Examiner—Vip Patel
Attorney, Agent, or Firm—Lowe, Price, LeBlanc & Becker

[57] ABSTRACT

A thermion emitting oxide cathode comprising a metal cap and a cathode sleeve, the metal cap being coated with a thermion emitting material layer containing a barium-based alkaline earth metal, wherein the thermion emitting material layer is made of a titanate of the barium-based alkaline earth metal. The thermion emitting oxide cathode is made by mixing a titanium tetrachloride ($TiCl_4$) with an aqueous solution of barium-strontium-calcium dichloride [(Ba—Sr—Ca)$Cl_2$], dropping the mixture into an oxalate solution of 80° C., thereby precipitating a barium-strontium-calcium titanate hydrate [(Ba—Sr—Ca)TiO($C_2O_4$)$_2$·$4H_2O$], and treating the precipitated barium-strontium-calcium titanate hydrate at a temperature of 500° to 700° C. to remove a plurality of water molecules, thereby producing a suspension of barium-strontium-calcium titanate [(Ba—Sr—Ca)$TiO_3$].

7 Claims, 2 Drawing Sheets

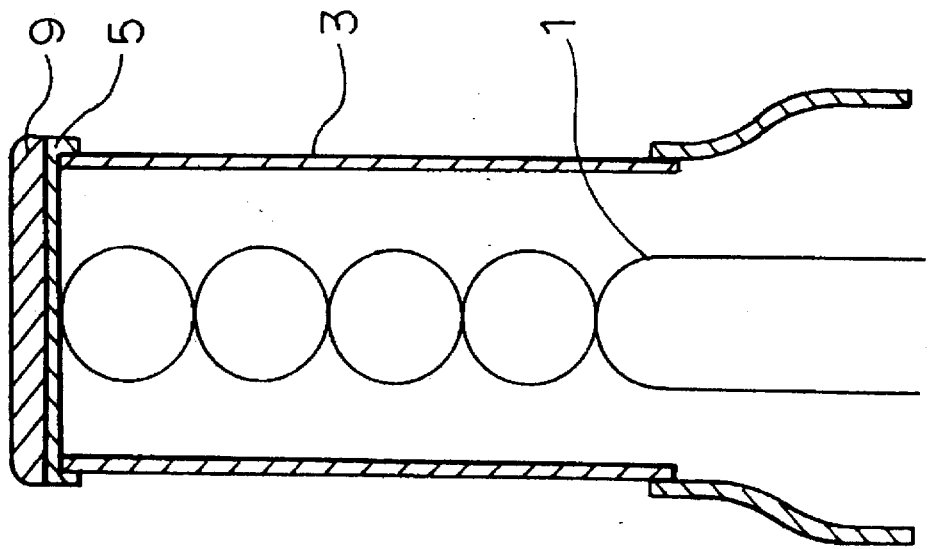
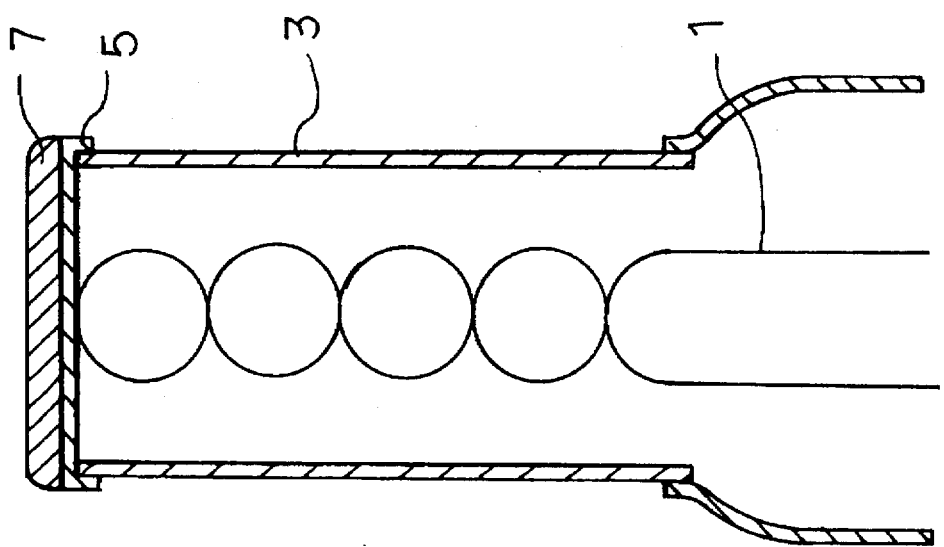

THERMION EMITTING OXIDE CATHODE AND METHOD FOR MAKING THE SAME

BACKGROUND OF THE INVENTION

1. Field of the Invention

The present invention relates to a thermion emitting oxide cathode and a method for making the same, and more particularly to a substance for making a thermion emitting oxide cathode widely used as a thermion emitting source such as an electronic or pick-up tube.

2. Description of the Prior Art

FIG. 1 shows a conventional thermion emitting cathode which is used as a thermion emitting source for Braun tubes in televisions. As shown in FIG. 1, the thermion emitting cathode includes a heater 1, a cathode sleeve 3 having a tube construction surrounding the heater 1, and a metal cap 5 capping the cathode sleeve 3. The metal cap 5 is made of a nickel-based compound containing traces of a reducer such as silicon or magnesium. Over the metal cap 5, a thermion emitting material layer 7 is coated, which is made of a three-element carbonate. This three-element carbonate used as the cathode substance is produced using a starting material which primarily comprises a three-element-stabilized carbonate containing barium, strontium and calcium in the form of a solid solution [$(Ba-Sr-Ca)CO_3$].

In order to allow the three-element-stabilized carbonate to act as a thermion emitting source, the cathode is heated to a temperature of about 1,000° C. by the heater 1 at the step of producing a vacuum in an electronic tube to be manufactured. By this heating, carbon dioxide is decomposed from the carbonate which is, in turn, changed into an oxide. That is, barium carbonate ($BaCO_3$) is thermally decomposed as expressed by the following formula so that it is changed into barium oxide (BaO) and carbon dioxide.

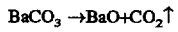

$$BaCO_3 \rightarrow BaO + CO_2 \uparrow$$

The reason why oxides such as (Ba—Sr—Ca)O are not used as a starting material of the cathode substance is because they absorb carbon dioxide existing in the form of moisture or gas in the atmosphere and are thereby easily changed into the form of barium carbonate. The reason why the above-mentioned carbonate is used as the starting material is because it is kept stable at room temperature and pressure so that it can be easily handled.

In spite of many advantages of such carbonates, the cathode is problematic in that cracks are generated at the cathode substance when the temperature of the cathode substance is abruptly raised to change the cathode substance into an oxide with a low work function capable of emitting thermions. Such cracks result in a degradation in the electron emitting characteristic. To this end, the step of decomposing carbon dioxide from the cathode substance should be slowly and sequentially carried out. This means that the manufacture of electronic tubes essentially involves a lengthened and slow carbon dioxide decomposition and exhaustion. As a result, a long manufacturing time is required.

SUMMARY OF THE INVENTION

Therefore, an object of the invention is to solve the above-mentioned problem involved in the prior art and to provide a thermion emitting oxide cathode being capable of greatly reducing the time taken for the carbon dioxide decomposing and exhausting process required in the manufacture of electronic tubes when the existing two- or three-element carbonates are used, thereby greatly reducing the manufacturing cost of the electronic tubes, and being capable of exhibiting a superior barium evaporation characteristic over those using a three-element carbonate and ensuring a lengthened use life thereof.

Another object of the invention is to provide a method for making the above-mentioned thermion emitting oxide cathode.

In accordance with one aspect, the present invention provides a thermion emitting oxide cathode comprising a metal cap and a cathode sleeve, the metal cap being coated with a thermion emitting material layer containing a barium-based alkaline earth metal, wherein the thermion emitting material layer is made of a titanate of the barium-based alkaline earth metal.

In accordance with another aspect, the present invention provides a method for making a thermion emitting oxide cathode, comprising the steps of: (a) mixing a titanium tetrachloride with an aqueous solution of barium-strontium-calcium dichloride, and dropping the mixture into an oxalate solution of 80° C., thereby precipitating a barium-strontium-calcium titanate hydrate; and (b) treating the precipitated barium-strontium-calcium titanate oxalate obtained at step (a) at a temperature of 500° to 700° C. to remove a plurality of water molecules, thereby producing a suspension of barium-strontium-calcium titanate.

BRIEF DESCRIPTION OF THE DRAWINGS

Other objects and aspects of the invention will become apparent from the following description of embodiments with reference to the accompanying drawings in which:

FIG. 1 is a sectional view illustrating a conventional oxide cathode;

FIG. 2 is a sectional view illustrating an oxide cathode in accordance with the present invention.

DETAILED DESCRIPTION OF THE PREFERRED EMBODIMENTS

Figure 3:
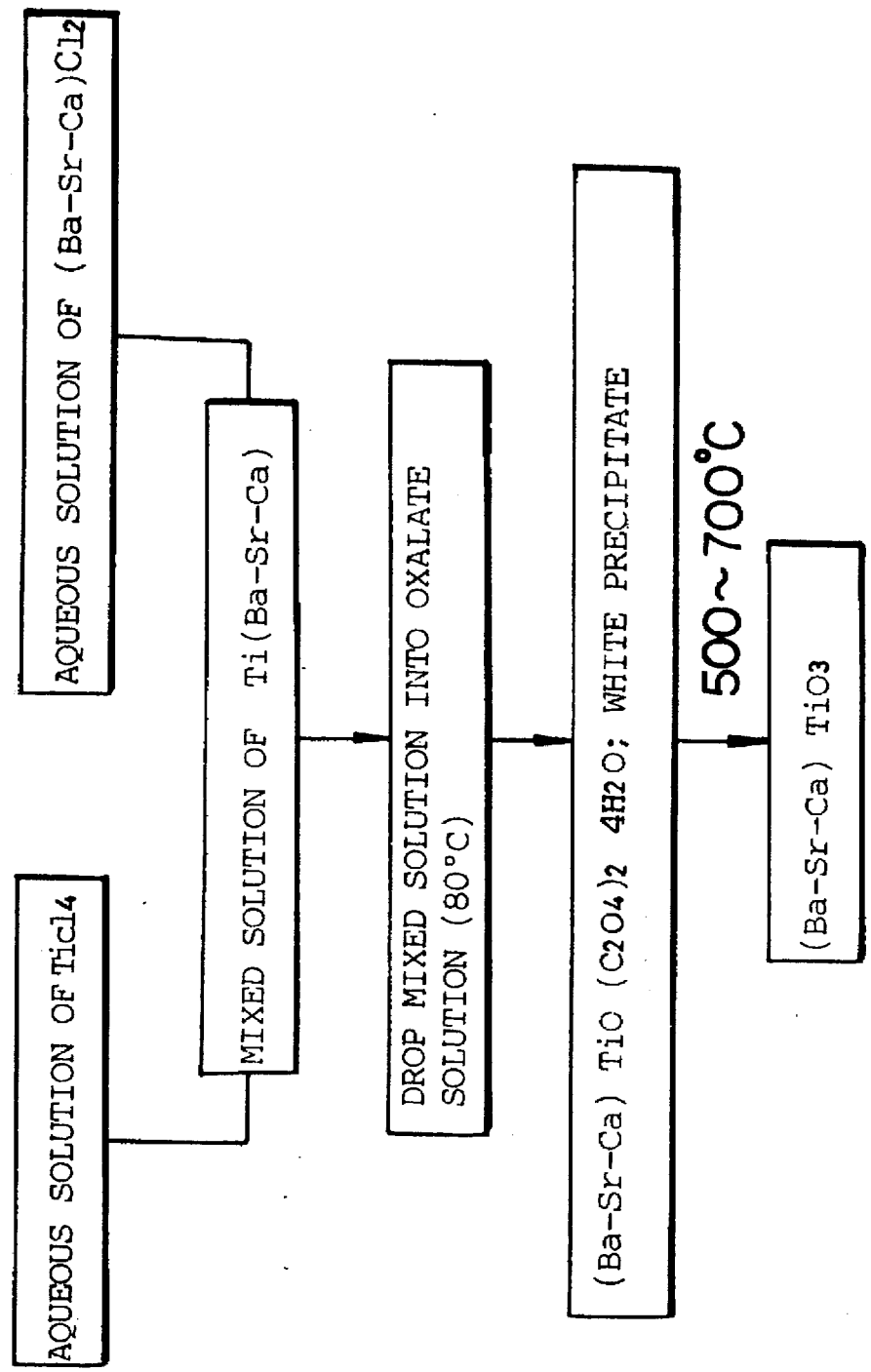
FIG. 3 is a flow chart illustrating a method for making the oxide cathode in accordance with the present invention.

FIG. 2 shows a thermion emitting oxide cathode made in accordance with the present invention. In FIG. 2, elements respectively corresponding to those in FIG. 1 are denoted by the same reference numerals. As shown in FIG. 2, the thermion emitting cathode includes a heater 1, a cathode sleeve 3 surrounding the heater 1, and a metal cap 5 capping the cathode sleeve 3. The metal cap 5 is coated with a thermion emitting material layer 9 made of a barium-strontium-calcium-based titanate containing barium as a chief element thereof and a solid solution of alkaline earth metals such as strontium and calcium.

FIG. 3 is a flow chart illustrating a method for producing a barium-strontium-calcium-based titanate in accordance with the present invention. The method shown in FIG. 3 is carried out using a compound precipitating process.

This method includes a first procedure of mixing titanium tetrachloride ($TiCl_4$) with an aqueous solution of barium-strontium-calcium dichloride [$(Ba-Sr-Ca)Cl_2$], and dropping the mixture into an oxalate solution of 80° C., thereby producing a white precipitate which is barium-strontium-calcium titanate oxalate [$(Ba-Sr-Ca)TiO(C_2O_4)_2 \cdot 4H_2O$]. The aqueous solution of barium-strontium-calcium dichloride has the same composition as the existing three-element-stabilized carbonate. Where the aqueous solution of barium-strontium-calcium dichloride is used to manufacture Braun tubes, it preferably has a composition having a barium:strontium:calcium ratio of 57.2:38.0:4.8 (wt %).

The method also includes a second procedure of treating the white precipitate, namely, the barium-strontium-calcium titanate oxalate obtained at the first procedure at a temperature of 500° to 700° C. to remove a plurality of water molecules, thereby producing a suspension of barium-strontium-calcium titanate [(Ba—Sr—Ca)TiO$_3$].

The barium-strontium-calcium titanate oxalate may be produced using the well-known hydrolysis or citrate-utilizing method in place of the compound precipitating method.

Now, the method for manufacturing the thermion emitting oxide cathode using the compound precipitation process will be described in detail.

At the first procedure, an aqueous solution of barium-strontium-calcium dichloride [(Ba—Sr—Ca)Cl$_2$] with a composition having a barium:strontium:calcium ratio of 57.2:38.0:4.8 (wt %) is mixed with titanium tetrachloride (TiCl$_4$). The resulting mixture is then dropped into an oxalate solution of 80° C., thereby producing a white precipitate which is barium-strontium-calcium titanate oxalate [(Ba—Sr—Ca)TiO(C$_2$O$_4$)$_2$.4H$_2$O].

In the second procedure, the barium-strontium-calcium titanate oxalate is treated at a temperature of 500° to 700° C., thereby producing a suspension of barium-strontium-calcium titanate [(Ba—Sr—Ca)TiO$_3$]. This suspension is then sprayed onto the metal cap 5 mounted to the cathode sleeve 3 so as to form a thermion emitting material layer 9. Thus, an oxide cathode as shown in FIG. 2 is manufactured.

When the oxide cathode manufactured in accordance with the above-mentioned method is subjected to a carbon dioxide decomposing and exhausting process in the manufacture of an electrode tube, ingredients of the suspension used in the manufacture of the cathode structure are removed as they are heated to a high temperature. Also, the exhausting of gaseous carbon dioxide from the cathode is completed in a short time. Further heating the cathode will not exhaust any more gas. Thus, the present invention basically solves the factor of lengthening the manufacturing time by changing the starting material. In accordance with the present invention, the time taken to decompose and exhaust the carbon dioxide can be remarkably reduced. The cathode material used in accordance with the present invention is stable not only at room temperature, but also at a higher temperature. In particular, the titanate of the cathode material contributes for the thermion emission of the cathode. Where the present oxide cathode is employed in an electronic tube, it exhibits a superior thermion emission characteristic. That is, the oxide cathode of the present invention exhibits a superior evaporation of barium, which is a primary thermion emitting source, over existing cathodes while emitting thermions in an approximately equal amount to the existing cathodes.

As apparent from the above description, the present invention provides a thermion emitting oxide cathode and a method for making the cathode, being capable of greatly reducing the carbon dioxide decomposing and exhausting time required in the manufacture of electronic tubes, thereby greatly reducing the manufacturing cost of the electronic tubes. In accordance with the present invention, it is possible to improve the characteristic of the cathode such as the characteristic distribution depending on the carbon dioxide decomposition degree. Accordingly, a uniform thermion emission characteristic is obtained. In addition, an improved barium evaporation characteristic is obtained. As a result, the life of the cathode is greatly lengthened.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A thermion emitting oxide cathode comprising a metal cap and a cathode sleeve, the metal cap being coated with a thermion emitting material layer containing a barium-based alkaline earth metal, wherein the thermion emitting material layer consists of a titanate of the barium-based alkaline earth metal.

2. The thermion emitting oxide cathode in accordance with claim 1, wherein the thermion emitting material layer is made of a barium-strontium titanate.

3. The thermion emitting oxide cathode in accordance with claim 1, wherein the thermion emitting material layer is made of a barium-strontium-calcium titanate.

4. A method for making a thermion emitting oxide cathode, comprising the steps of:

(a) mixing a titanium tetrachloride with an aqueous solution of barium-strontium-calcium dichloride, and dropping the mixture into an oxalate solution of 80° C., thereby precipitating a barium-strontium-calcium titanate oxalate; and (b) treating the precipitated barium-strontium-calcium titanate oxylate obtained at step (a) at a temperature of 500° to 700° C. to remove a plurality of water molecules, thereby producing a suspension of barium-strontium-calcium titanate.

5. The method in accordance with claim 4, wherein the aqueous solution of barium-strontium-calcium dichloride has a composition having a barium:strontium:calcium ratio of 57.2:38.0:4.8 (wt %).

6. A thermion emitting oxide cathode comprising a metal cap and a cathode sleeve, the metal cap being coated with a thermion emitting material layer containing a barium-based alkaline earth metal, wherein the thermion emitting material layer is made of a barium-strontium titanate.

7. A thermion emitting oxide cathode comprising a metal cap and a cathode sleeve, the metal cap being coated with a thermion emitting material layer containing a barium-based alkaline earth metal, wherein the thermion emitting material layer is made of a barium-strontium-calcium titanate.

* * * * *